US012536956B2

(12) United States Patent
Lim et al.

(10) Patent No.: US 12,536,956 B2
(45) Date of Patent: Jan. 27, 2026

(54) DISPLAY DEVICE

(71) Applicant: SAMSUNG DISPLAY CO., LTD., Yongin-si (KR)

(72) Inventors: Hyunho Lim, Yongin-si (KR); Yoosung Kim, Yongin-si (KR); Myeongbin Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/638,887

(22) Filed: Apr. 18, 2024

(65) Prior Publication Data

US 2024/0420631 A1 Dec. 19, 2024

(30) Foreign Application Priority Data

Jun. 14, 2023 (KR) ........................ 10-2023-0076171

(51) Int. Cl.
*G09G 3/3225* (2016.01)
*G09G 3/3275* (2016.01)

(52) U.S. Cl.
CPC ......... *G09G 3/3225* (2013.01); *G09G 3/3275* (2013.01); *G09G 2310/0202* (2013.01); *G09G 2310/0251* (2013.01); *G09G 2310/027* (2013.01); *G09G 2310/0286* (2013.01); *G09G 2310/0291* (2013.01)

(58) Field of Classification Search
CPC ... G09G 2310/0205; G09G 2310/0262; G09G 2310/027
See application file for complete search history.

(56) References Cited

U.S. PATENT DOCUMENTS 5,473,153 A * 12/1995 Araki ................. G06K 15/1209 250/235
5,596,349 A * 1/1997 Kobayashi ........... G09G 3/2059 345/89
6,144,355 A * 11/2000 Murata ................ G09G 3/3611 345/99
7,821,484 B2 10/2010 Choi
11,450,282 B2 9/2022 Park et al.
(Continued)

FOREIGN PATENT DOCUMENTS

KR 10-0198667 B1 6/1999
KR 10-0662988 B1 12/2006
(Continued)

*Primary Examiner* — Van N Chow
(74) *Attorney, Agent, or Firm* — F. CHAU & ASSOCIATES, LLC

(57) ABSTRACT

A display device includes a display panel including a plurality of pixels and a plurality of data lines, a source driving circuit that outputs a data signal, and a selection circuit disposed between the plurality of data lines and the source driving circuit that selectively connects the source driving circuit to some of the plurality of data lines. The source driving circuit includes a first latch that generates line image data, a second latch that receives the line image data from the first latch and outputs the line image data in response to a first latch control signal, and a third latch that receives the line image data from the second latch and outputs the line image data in response to a second latch control signal. The period of the first latch control signal is constant, and the period of the second latch control signal is variable.

20 Claims, 11 Drawing Sheets

(56) References Cited

U.S. PATENT DOCUMENTS

| | | | | |
|---|---|---|---|---|
| 2005/0035981 | A1* | 2/2005 | Ozaki | G09G 5/399 345/690 |
| 2009/0066628 | A1* | 3/2009 | Uehara | G09G 3/3622 345/101 |
| 2024/0105125 | A1* | 3/2024 | Kim | G09G 3/3688 |
| 2024/0420631 | A1* | 12/2024 | Lim | G09G 3/3225 |

FOREIGN PATENT DOCUMENTS

| | | | |
|---|---|---|---|
| KR | 10-2281012 | B1 | 7/2021 |
| KR | 10-2022-0019905 | A | 2/2022 |

* cited by examiner

DISPLAY DEVICE

CROSS-REFERENCE TO RELATED APPLICATIONS

This application claims priority under 35 U.S.C. § 119 to Korean Patent Application No. 10-2023-0076171, filed on Jun. 14, 2023 in the Korean Intellectual Property Office, the disclosure of which is incorporated by reference herein in its entirety.

TECHNICAL FIELD

Embodiments of the present disclosure relate to a display device, and more particularly, to a display device capable of improving image quality.

DISCUSSION OF RELATED ART

A light emitting display device displays an image by using a light emitting diode that generates light through the recombination of electrons and holes. The light emitting display device is driven with low power while providing a fast response speed.

The light emitting display device includes a display panel in which pixels connected to data lines and a scan line are arranged. Each of the pixels generally includes a light emitting diode and a pixel circuit portion that controls the amount of current flowing to the light emitting diode. The pixel circuit portion controls the amount of current flowing through the light emitting diode in response to a data signal. In this case, light having a predetermined luminance is generated corresponding to the amount of current flowing through the light emitting diode.

SUMMARY

Embodiments of the present disclosure provide a display device capable of sufficiently securing an active interval of a scan signal while reducing the number of channels of a source driving circuit.

According to an embodiment, a display device includes a display panel including a plurality of pixels and a plurality of data lines connected to the plurality of pixels, a source driving circuit that outputs a data signal to the plurality of data lines, and a selection circuit disposed between the plurality of data lines and the source driving circuit and configured to selectively connect the source driving circuit to some of the plurality of data lines.

The source driving circuit includes a first latch that generates line image data by sequentially storing image data in response to a data clock signal, a second latch that receives the line image data from the first latch and outputs the line image data in response to a first latch control signal, and a third latch that receives the line image data from the second latch and outputs the line image data in response to a second latch control signal. The period of the first latch control signal is constant, and the period of the second latch control signal is variable.

According to an embodiment, a display device includes a display panel including a plurality of pixels and a plurality of data lines connected to the plurality of pixels, a source driving circuit that outputs the data signal, and a selection circuit disposed between the plurality of data lines and the source driving circuit, and configured to selectively connect the source driving circuit to some of the plurality of data lines.

The source driving circuit may include a first latch and a second latch. The first latch may generate line image data by sequentially storing image data in response to a data clock signal. The second latch may include a first sub-latch and a second sub-latch, and alternately store the line image data received from the first latch in the first and second sub latches. The second latch may output first line image data of the first sub-latch in response to a first sub-latch control signal, and output second line image data of the second sub-latch in response to a second sub-latch control signal.

The start time of a second sub-output interval of the second sub-latch control signal may precede the ½ point of a first sub-output interval of the first sub-latch control signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
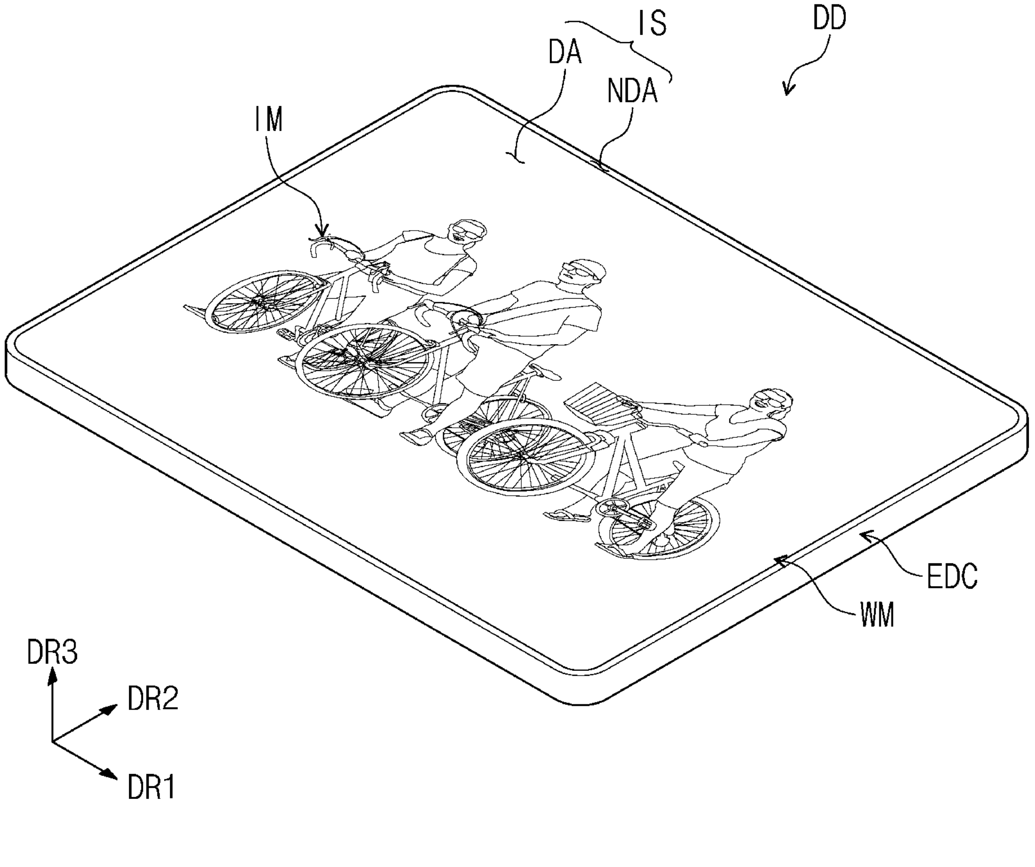
FIG. 1 is a perspective view illustrating a display device according to an embodiment of the present disclosure.

Embodiments of the present disclosure will be described more fully hereinafter with reference to the accompanying drawings. Like reference numerals may refer to like elements throughout the accompanying drawings In the specification, the expression that a first component (or area, layer, part, portion, etc.) is "on", "connected to", or "coupled to" a second component may mean that the first component is directly on, connected to, or coupled to the second component, or may mean that a third component is disposed therebetween.

The expression "and/or" includes one or more combinations which associated components are capable of defining.

Although the terms "first", "second", etc. may be used to describe various components, the components should not be construed as being limited by the terms. The terms are used only to differentiate one component from another component. For example, without departing the scope of the disclosure, a first component may be referred to as a second component, and similarly, a second component may be referred to as a first component. As used herein, singular forms may include plural forms as well unless the context clearly indicates otherwise.

Also, the terms “under”, “below”, “on”, “above”, etc. are used to describe the correlation of components illustrated in drawings. The terms are relative and are described with reference to a direction indicated in the drawing.

It will be further understood that the terms “comprises”, “includes”, “have”, etc. specify the presence of stated features, numbers, steps, operations, elements, components, or a combination thereof but do not preclude the presence or addition of one or more other features, numbers, steps, operations, elements, components, or a combination thereof.

Herein, when two or more elements or values are described as being substantially identical or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term “about” as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, “about” may mean within one or more standard deviations as understood by one of the ordinary skill in the art. Further, it is to be understood that while parameters may be described herein as having “about” a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Figure 2:
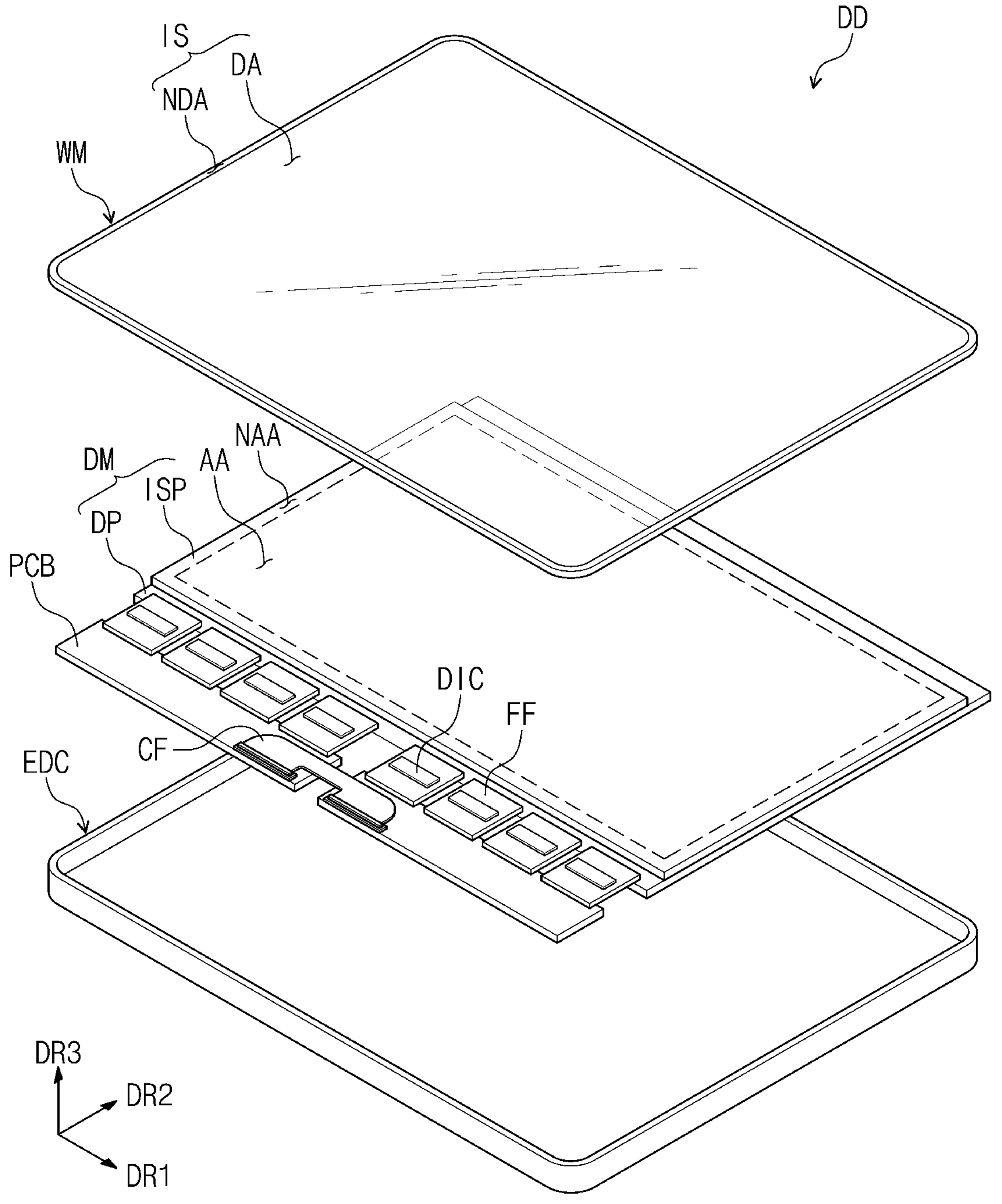
FIG. 2 is an exploded perspective view of a display device according to an embodiment of the present disclosure.

FIG. 1 is a perspective view of a display device according to an embodiment of the present disclosure. FIG. 2 is an exploded perspective view of a display device according to an embodiment of the present disclosure.

Referring to FIGS. 1 and 2, a display device DD may be a device that is activated depending on an electrical signal. The display device DD according to embodiments of the present disclosure may be a small and medium-sized electronic device such as, for example, a mobile phone, a tablet, a vehicle navigation system, or a game console, as well as a large-sized electronic device such as, for example, a television or a monitor. The above examples are provided only as an example, and the display device DD may be implemented with any other display device(s) without departing from the concept of embodiments of the present disclosure. The display device DD may be in the shape of a rectangle having a long edge (or side) in a first direction DR1 and having a short edge (or side) in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative in concept and may be changed to different directions.

The display device DD may sense an external input applied from outside of the display device DD. The external input may include various types of inputs that are provided from outside of the display device DD. The display device DD according to an embodiment of the present disclosure may sense an external input of a user, which is applied from outside of the display device DD. The external input of the user may be one of various types of external inputs, such as, for example, a part of his/her body, a light, heat, his/her eye, and pressure, or a combination thereof. Also, the display device DD may sense the external input of the user applied to the side surface or rear surface of the display device DD depending on a structure of the display device DD. In an embodiment of the present disclosure, the external input may include an input that is applied by using an input device (e.g., a stylus pen, an active pen, a touch pen, an electronic pen, or an E-pen).

The display surface IS of the display device DD may be divided into a display area DA and a non-display area NDA. The display area DA may refer to an area in which the image IM is displayed. The user perceives (or views) the image IM through the display area DA. In an embodiment, the display area DA is illustrated in the shape of a quadrangle whose vertexes are rounded. However, this is illustrated as an example. The display area DA may have various shapes according to embodiments.

The non-display area NDA is adjacent to the display area DA. The non-display area NDA may have a given color. The non-display area NDA may surround the display area DA. As such, a shape of the display area DA may be defined substantially by the non-display area NDA. However, this is illustrated as an example. The non-display area NDA may be disposed adjacent to only one side of the display area DA or may be omitted.

As illustrated in FIG. 2, the display device DD may include a display module DM and a window WM disposed on or over the display module DM. The display module DM may include a display panel DP and an input sensing layer ISP.

The display panel DP according to an embodiment of the present disclosure may be a light emitting display panel. For example, the display panel DP may be an organic light emitting display panel, an inorganic light emitting display panel, a quantum dot light emitting display panel. An emission layer of the organic light emitting display layer may include an organic light emitting material. An emission layer of the inorganic light emitting display panel may include an inorganic light emitting material. An emission layer of the quantum dot light emitting display panel may include a quantum dot, a quantum rod, etc.

The display panel DP may output the image IM, and the output image IM may be displayed on the display surface IS.

The input sensing layer ISP may be disposed on the display panel DP and may sense an external input. The input sensing layer ISP may be directly disposed on the display panel DP. According to an embodiment of the present disclosure, the input sensing layer ISP may be formed on the display panel DP through a subsequent process. That is, in the case where the input sensing layer ISP is directly disposed on the display panel DP, an inner adhesive film is not interposed between the input sensing layer ISP and the display panel DP. However, the inner adhesive film may be interposed between the input sensing layer ISP and the display panel DP. In this case, the input sensing layer ISP is not manufactured by a process continuous to that of the display panel DP. That is, the input sensing layer ISP may be manufactured through a process that is independent of that of the display panel DP and may then be fixed on an upper surface of the display panel DP by the inner adhesive film.

The window WM may be formed of a transparent material capable of outputting the image IM. For example, the window WM may be formed of glass, sapphire, plastic, or the like. An example in which the window WM is implemented with a single layer is illustrated, but the present disclosure is not limited thereto. For example, the window WM may include a plurality of layers.

In an embodiment, the non-display area NDA of the display device DD described above may correspond to an area that is defined by printing a material including a given color on one area of the window WM. In an embodiment of the present disclosure, the window WM may include a light blocking (or shielding) pattern that defines the non-display area NDA. The light blocking pattern that is a colored organic film may be formed, for example, in a coating manner.

The window WM may be coupled to the display module DM by an adhesive film. In an embodiment of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

An anti-reflection layer may be further interposed between the window WM and the display module DM. The anti-reflection layer decreases reflectance of an external light incident from above the window WM. The anti-reflection layer according to an embodiment of the present disclosure may include a phase retarder and a polarizer. The phase retarder may have a film type or a liquid crystal coating type and may include a N/2 phase retarder and/or a N/4 phase retarder. The polarizer may also have a film type or a liquid crystal coating type. The film type may include a stretch-type synthetic resin film, and the liquid crystal coating type may include liquid crystals arranged in a given direction. The retarder and the polarizer may be implemented with one polarization film.

In an embodiment of the present disclosure, the anti-reflection layer may also include color filters. The arrangement of color filters may be determined in consideration of colors of lights that a plurality of pixels PX (refer to FIG. 3) included in the display panel DP generate. In this case, the anti-reflection layer may further include a light blocking pattern disposed between color filters.

The display module DM may display the image IM depending on an electrical signal and may send/receive information about an external input. The display module DM may be defined by an active area AA and a non-active area NAA. The active area AA may be defined as an area in which the image IM is output from the display panel DP (e.g., an area in which the image IM is displayed). Also, the active area AA may be defined as an area in which the input sensing layer ISP senses an external input applied from outside of the display device DD. According to an embodiment, the active area AA of the display module DM may correspond to (or overlap) at least a portion of the display area DA.

The non-active area NAA is adjacent to the active area AA. The non-active area NAA may refer to an area in which the image IM is not displayed substantially. For example, the non-active area NAA may surround the active area AA. However, this is illustrated as an example. For example, the non-active area NAA may be defined in various shapes according to embodiments. According to an embodiment, the non-active area NAA of the display module DM may correspond to (or overlap) at least a portion of the non-display area NDA.

The display device DD may further include a plurality of flexible films FF connected to the display panel DP. A driver chip DIC may be mounted on each of the flexible films FF. In an embodiment of the present disclosure, a source driving circuit 200 (see FIG. 3) may include the plurality of driver chips DIC, and the plurality of driver chips DIC may be respectively mounted on the plurality of flexible films FF.

The display device DD may further include at least one printed circuit board (PCB) coupled to the plurality of flexible films FF. In an embodiment of the present disclosure, the four printed circuit boards PCB are provided in the display device DD, but the number of printed circuit boards PCB is not limited thereto. Two printed circuit boards adjacent to each other from among the printed circuit boards PCB may be electrically connected to each other by a connecting film CF. Also, at least one of the printed circuit boards PCB may be electrically connected to a main board. A driving controller 100 (see FIG. 3) and a voltage generator 400 (see FIG. 3) may be disposed on at least one of the printed circuit boards PCB.

FIG. 2 shows a structure in which the driver chips DIC are respectively mounted on the flexible films FF, but the present disclosure is not limited thereto. For example, the driver chips DIC may be directly mounted on the display panel DP in an embodiment. In this case, a portion of the display panel DP, on which the driver chip DIC is mounted, may be bent such that the driver chip DIC is disposed on a rear surface of the display module DM.

The input sensing layer ISP may be electrically connected to the printed circuit board PCB through the flexible films FF. However, the present disclosure is not limited thereto. That is, the display module DM may additionally include a separate flexible film that electrically connects the input sensing layer ISP and the printed circuit board PCB.

The display device DD may further include a housing EDC that accommodates the display module DM. The housing EDC may be coupled to the window WM to define the exterior of the display device DD. The housing EDC may absorb external shocks and may prevent a foreign material/moisture or the like from being infiltrated into the display module DM such that components accommodated in the housing EDC are protected. In an embodiment of the present disclosure, the housing EDC may be provided in the form of a combination of a plurality of accommodating members.

The display device DD according to an embodiment may further include an electronic module including various functional modules that operate the display module DM, a power supply module (e.g., a battery) that supplies power utilized for overall operations of the display device DD, a bracket coupled to the display module DM and/or the housing EDC to partition an inner space of the display device DD, etc.

Figure 3:
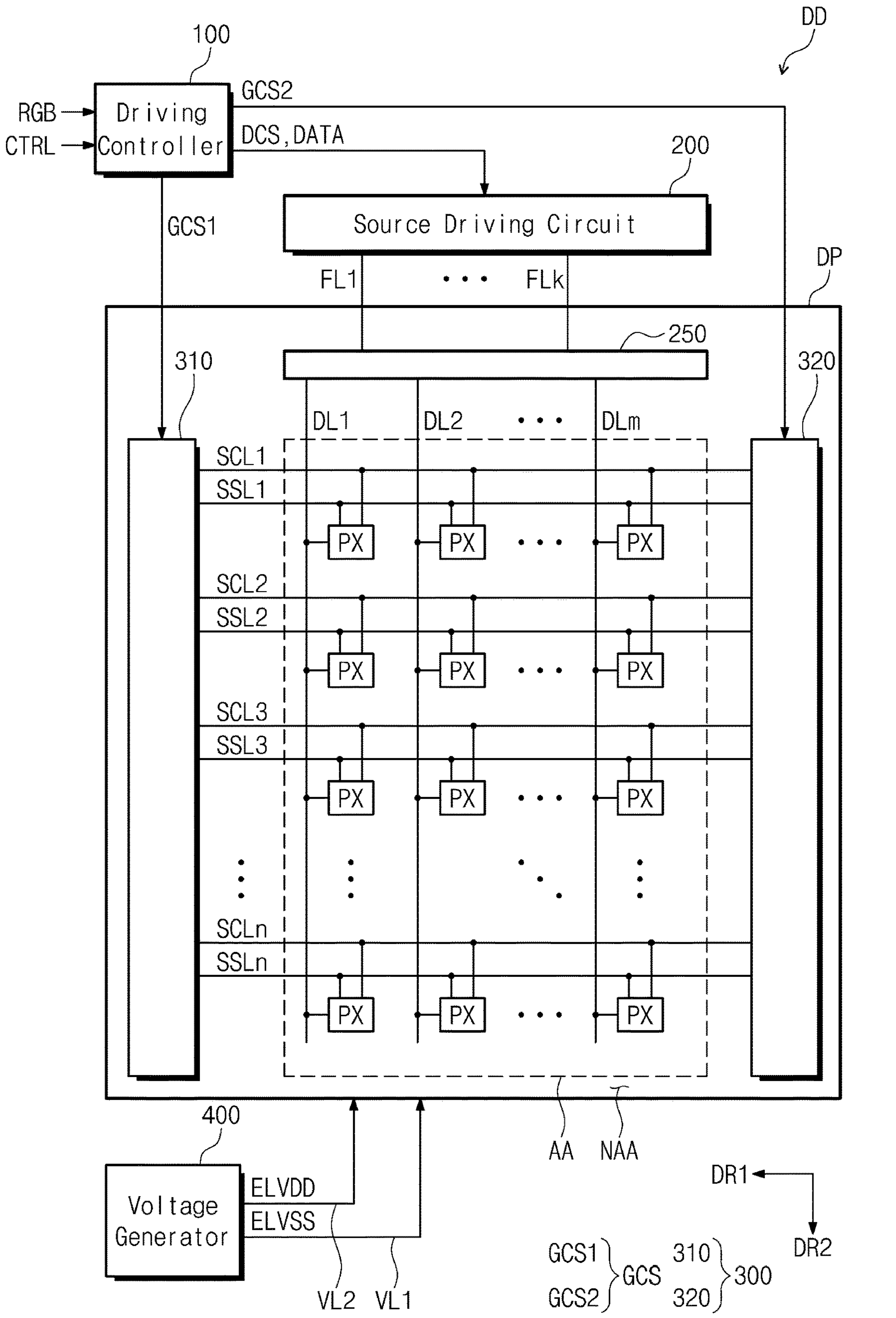
FIG. 3 is a block diagram of a display device according to an embodiment of the present disclosure.

FIG. 3 is a block diagram of a display device according to an embodiment of the present disclosure.

Referring to FIG. 3, the display device DD may include the driving controller 100, the source driving circuit 200, a selection circuit 250, a scan driving circuit 300, the voltage generator 400, and the display panel DP. In an embodiment of the present disclosure, the source driving circuit 200 may include a data driver and a sensing driver.

The display panel DP may include driving scan lines SCL1 to SCLn, sensing scan lines SSL1 to SSLn, data lines DL1 to DLm, and the pixels PX. Here, "n" and "m" are an integer of 1 or more. The display panel DP may be divided into the active area AA and the non-active area NAA. The pixels PX may be disposed in the active area AA, and the scan driving circuit 300 may be disposed in the non-active area NAA.

The driving scan lines SCL1 to SCLn and the sensing scan lines SSL1 to SSLn may extend in the first direction DR1 and may be spaced from each other in the second direction DR2. The second direction DR2 may be a direction crossing the first direction DR1. The data lines DL1 to DLm may extend from the source driving circuit 200 in the second direction DR2 and may be spaced from each other in the first direction DR1.

The plurality of pixels PX are electrically connected to the driving scan lines SCL1 to SCLn, the sensing scan lines SSL1 to SSLn, and the data lines DL1 to DLm. Each of the pixels PX may be electrically connected to two scan lines. It should be noted that the number of scan lines connected to each pixel PX is not limited thereto. For example, each of the plurality of pixels PX may be electrically connected to one or three scan lines. The display panel DP may further include sensing lines extending in the second direction DR2 and arranged in the first direction DR1. In this case, the plurality of pixels PX may be connected to the sensing lines.

Each of the plurality of pixels PX may include a light emitting element and a pixel circuit portion that controls light emission of the light emitting element. The light emitting element may include an organic light emitting diode. The pixel circuit portion may include a plurality of transistors and at least one capacitor.

The driving controller 100 receives an input image signal RGB and a control signal CTRL from a main controller (e.g., a microcontroller or a graphics controller). The driving controller 100 may generate image data DATA by performing conversion of the input image signal RGB.

The driving controller 100 may generate a scan control signal GCS and a source control signal DCS based on the control signal CTRL. The source driving circuit 200 may receive the source control signal DCS and the image data DATA from the driving controller 100, and convert the image data DATA into data signals in response to the source control signal DCS. The source driving circuit 200 may output the data signals to the plurality of data lines DL1 to DLm. The data signals may be analog voltages corresponding to grayscale values of the image data DATA.

Alternatively, the source driving circuit 200 may be further connected to a plurality of sensing lines. In this case, the source driving circuit 200 may further receive the sensing control signal from the driving controller 100, and sense the characteristics of elements included in each pixel PX of the display panel DP, in response to the sensing control signal.

In an embodiment of the present disclosure, the source driving circuit 200 may be formed in the form of at least one chip. For example, the source driving circuit 200 may be disposed in the driver chips DIC shown in FIG. 2.

The selection circuit 250 may be disposed between the data lines DL1 to DLm and the source driving circuit 200. The source driving circuit 200 may be connected to the selection circuit 250 through fanout lines FL1 to FLk. Here, "k" is an integer greater than or equal to 1 and less than "m". In an embodiment of the present disclosure, the number (k) of the fanout lines FL1 to FLk may be ½, ⅓, or ¼ of the number (m) of the data lines DL1 to DLm. When the number (k) of the fanout lines FL1 to FLk is ½ of the number (m) of the data lines, the data lines DL1 to DLm may be divided into two groups (e.g., a first data line group and a second data line group). The selection circuit 250 may electrically connect a part of the data lines DL1 to DLm (e.g., the first data line group) to the source driving circuit 200 during a first selection interval SP1 (see FIG. 7), and electrically connect a part of the data lines DL1 to DLm (e.g., the second data line group) to the source driving circuit 200 during the second selection interval SP2 (see FIG. 7).

In an embodiment of the present disclosure, the selection circuit 250 may be disposed in the non-active area NAA of the display panel DP. For example, the selection circuit 250 may be formed in the non-active area NAA through the same process as the pixel circuit portion of each pixel PX. By selectively driving the data lines DL1 to DLm using the selection circuit 250, the number of channels CH1 to CHk (see FIG. 4) and the number of the fanout lines FL1 to FLk may be reduced.

The scan driving circuit 300 may receive the scan control signal GCS from the driving controller 100. The scan driving circuit 300 may output scan signals in response to the scan control signal GCS. The scan driving circuit 300 may be embedded in the display panel DP. When the scan driving circuit 300 is embedded in the display panel DP, the scan driving circuit 300 may include transistors formed through the same process as the pixel circuit portion of each pixel PX. The scan driving circuit 300 may be disposed in the non-active area NAA of the display panel DP, but the present disclosure is not limited thereto. The scan driving circuit 300 may overlap the active area AA of the display panel DP.

The scan driving circuit 300 may generate a plurality of driving scan signals and a plurality of sensing scan signals in response to the scan control signal GCS. The plurality of driving scan signals may be applied to the driving scan lines SCL1 to SCLn, and the plurality of sensing scan signals may be applied to the sensing scan lines SSL1 to SSLn.

In an embodiment of the present disclosure, the scan driving circuit 300 may include a first scan driving circuit 310 and a second scan driving circuit 320. The first scan driving circuit 310 may be disposed on the left side of the active area AA, and the second scan driving circuit 320 may be disposed on the right side of the active area AA. The first scan driving circuit 310 may receive a first scan control signal GCS1 from the driving controller 100, and the second scan driving circuit 320 may receive a second scan control signal GCS2 from the driving controller 100. The first scan driving circuit 310 may generate a plurality of driving scan signals and a plurality of sensing scan signals in response to the first scan control signal GCS1. The second scan driving circuit 320 may generate a plurality of driving scan signals and a plurality of sensing scan signals in response to the second scan control signal GCS2.

Although it is illustrated in FIG. 3 that the first and second scan driving circuits 310 and 320 are respectively disposed on the left and right sides of the active area AA, the present disclosure is not limited thereto. In an embodiment, the scan driving circuit 300 may include only one of the first and second scan driving circuits 310 and 320.

Each of the plurality of pixels PX may receive a first driving voltage ELVSS and a second driving voltage ELVDD.

The voltage generator 400 may generate voltages utilized for operation of the display panel DP. In an embodiment of the present disclosure, the voltage generator 400 may generate the first driving voltage ELVSS and the second driving voltage ELVDD utilized for the operation of the display panel DP. The first driving voltage ELVSS and the second driving voltage ELVDD may be provided to the display panel DP through a first driving voltage line VL1 and a second driving voltage line VL2.

The voltage generator 400 may further generate various voltages utilized for the operations of the source driving circuit 200 and the scan driving circuit 300 (e.g., gamma reference voltage, data driving voltage, gate-on voltage, or gate-off voltage) in addition to the first driving voltage ELVSS and the second driving voltage ELVDD.

Figure 4:
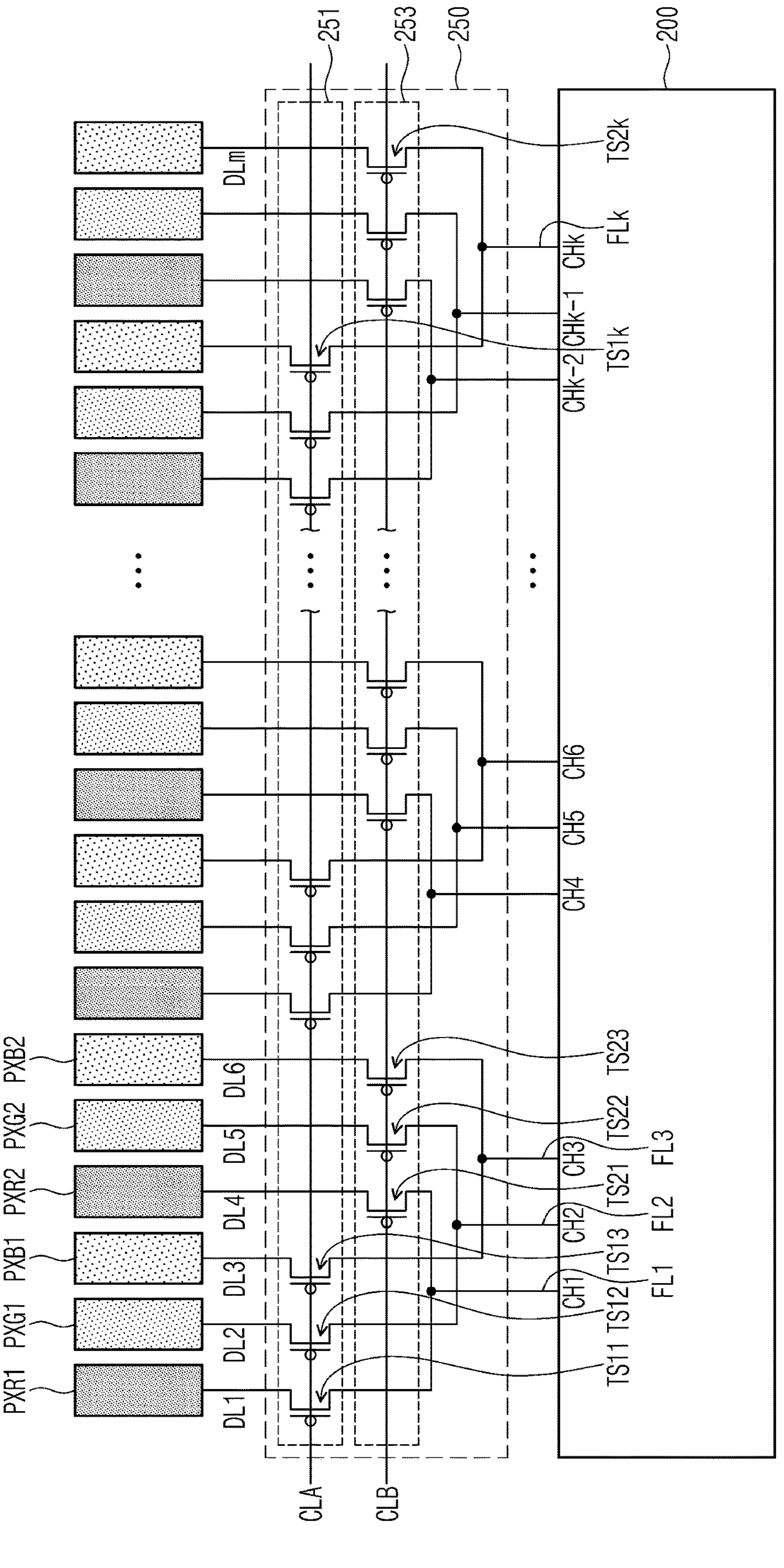
FIG. 4 is a block diagram showing a connection relationship between a source driving circuit and a selection circuit according to an embodiment of the present disclosure.

FIG. 4 is a block diagram showing a connection relationship between a source driving circuit and a selection circuit according to an embodiment of the present disclosure.

Referring to FIG. 4, the source driving circuit 200 may be connected to the selection circuit 250 through the fanout lines FL1 to FLk. The source driving circuit 200 may include a plurality of channels CH1, CH2, CH3, CH4, CH5, CH6 to CHk−2, CHk−1, and CHk respectively connected to the fanout lines FL1 to FLk. The fanout lines FL1 to FLk may be selectively connected to relevant data lines among the data lines DL1 to DLm through the selection circuit 250. In an embodiment of the present disclosure, the number (k) of fanout lines FL1 to FLk may be ½ of the number (m) of data lines.

The selection circuit 250 may include a plurality of switching circuits. In an embodiment of the present disclosure, the selection circuit 250 may include a first switching circuit 251 and a second switching circuit 253. The first and second switching circuits 251 and 253 may be activated alternately. An interval in which the first switching circuit 251 is activated is referred to as the first selection interval SP1 (see FIG. 7), and an interval in which the second switching circuit 253 is activated is referred to as the second selection interval SP2 (see FIG. 7). The first switching circuit 251 may be activated during the first selection interval SP1 to electrically connect the fanout lines FL1 to FLk to some of the data lines DL1 to DLm (e.g., the first data line group). The second switching circuit 253 may be activated during the second selection interval SP2 to electrically connect the fanout lines FL1 to FLk to some of the data lines DL1 to DLm (e.g., the second data line group).

The first switching circuit 251 may include a plurality of first switching transistors TS11 to TS1*k*, and the second switching circuit 253 may include a plurality of second switching transistors TS21 to TS2*k*. The plurality of first switching transistors TS11 to TS1*k* may be connected between the first data line group and the fanout lines FL1 to FLk, and the plurality of second switching transistors TS21 to TS2*k* may be connected between the second data line group and the fanout lines FL1 to FLk.

Among the plurality of first switching transistors TS11 to TS1*k*, a (1-1)-th switching transistor TS11 may include an input electrode connected to the first fanout line FL1 of the fanout lines FL1 to FLk, an output electrode connected to the first data line DL1 of the data lines DL1 to D1*m*, and a control electrode that receives a first selection signal CLA. Among the plurality of first switching transistors TS11 to TS1*k*, a (1-2)-th switching transistor TS12 may include an input electrode connected to the second fanout line FL2 of the fanout lines FL1 to FLk, an output electrode connected to the second data line DL2 of the data lines DL1 to D1*m*, and a control electrode that receives the first selection signal CLA. Among the plurality of first switching transistors TS11 to TS1*k*, a (1-3)-th switching transistor TS13 may include an input electrode connected to the third fanout line FL3 of the fanout lines FL1 to FLk, an output electrode connected to the third data line DL3 of the data lines DL1 to D1*m*, and a control electrode that receives the first selection signal CLA.

In an embodiment of the present disclosure, the first to third data lines DL1, DL2, and DL3 may be connected to first to third pixels PXR1, PXG1, and PXB1, respectively. The first to third pixels PXR1, PXG1, and PXB1 may output light of different colors.

Among the plurality of second switching transistors TS21 to TS2*k*, a (2-1)-th switching transistor TS21 may include an input electrode connected to the first fanout line FL1 of the fanout lines FL1 to FLk, an output electrode connected to the fourth data line DL4 of the data lines DL1 to DLm, and a control electrode that receives a second selection signal CLB. Among the plurality of second switching transistors TS21 to TS2*k*, a (2-2)-th switching transistor TS22 may include an input electrode connected to the second fanout line FL2 of the fanout lines FL1 to FLk, an output electrode connected to the fifth data line DL5 of the data lines DL1 to DLm, and a control electrode that receives the second selection signal CLB. Among the plurality of second switching transistors TS21 to TS2*k*, a (2-3)-th switching transistor TS23 may include an input electrode connected to the third fanout line FL3 of the fanout lines FL1 to FLk, an output electrode connected to the sixth data line DL6 of the data lines DL1 to DLm, and a control electrode that receives the second selection signal CLB.

In an embodiment of the present disclosure, the fourth to sixth data lines DL4, DL5, and DL6 may be connected to fourth to sixth pixels PXR2, PXG2, and PXB2, respectively. The fourth to sixth pixels PXR2, PXG2, and PXB2 may output light of different colors. The first and fourth pixels PXR1 and PXR2 may output light of a first color (e.g., red light), the second and fifth pixels PXG1 and PXG2 may output light of a second color (e.g., green light), and the third and sixth pixels PXB1 and PXB2 may output light of a third color (e.g., blue light).

When the first selection signal CLA is activated during the first selection interval SP1, the first switching transistors TS11 to TS1*k* may be turned on, and the data signals provided to the fanout lines FL1 to FLk may be applied to the first data line group through the first switching transistors TS11 to TS1*k*. When the second selection signal CLB is activated during the second selection interval SP2, the second switching transistors TS21 to TS2*k* may be turned on, and the data signals provided to the fanout lines FL1 to FLk may be applied to the second data line group through the second switching transistors TS21 to TS2*k*.

In an embodiment, each of the first and second switching transistors TS11 to TS1*k* and TS21 to TS2*k* may be a P-type transistor. However, the present disclosure is not limited thereto, and each of the first and second switching transistors TS11 to TS1*k* and TS21 to TS2*k* may be an N-type transistor according to an embodiment. When the first and second switching transistors TS11 to TS1*k* and TS21 to TS2*k* are P-type transistors, the first and second selection signals CLA and CLB may have a low level during the first and second selection intervals SP1 and SP2. When the first and second switching transistors TS11 to TS1*k* and TS21 to TS2*k* are N-type transistors, the first and second selection signals CLA and CLB may have a high level during the first and second selection intervals SP1 and SP2.

Figure 5:
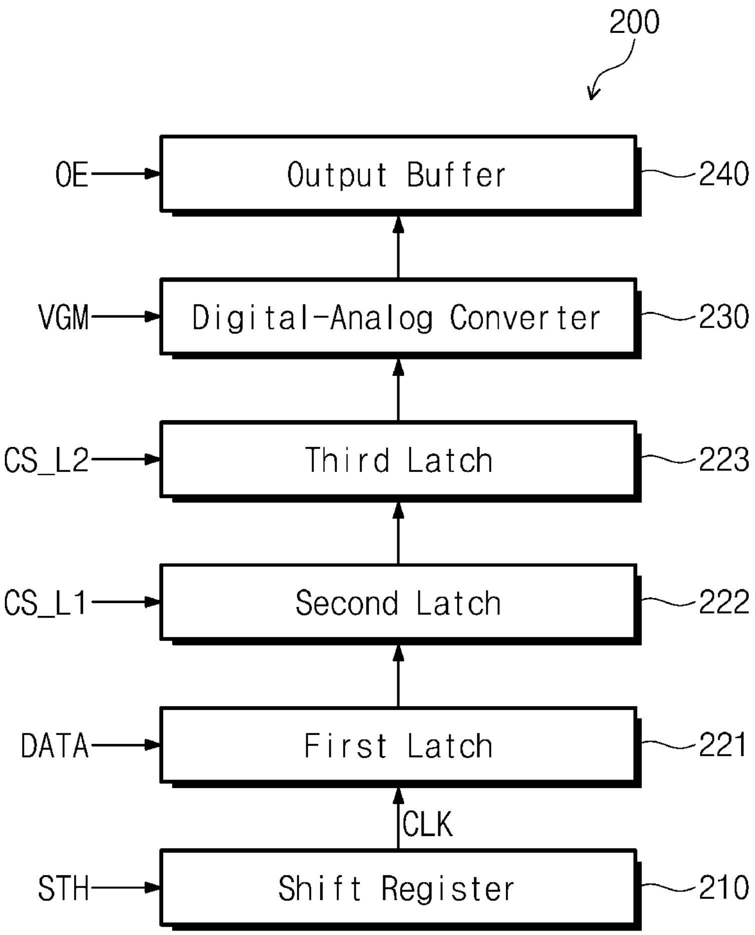
FIG. 5 is a block diagram of a source driving circuit according to an embodiment of the present disclosure.
Figure 6:
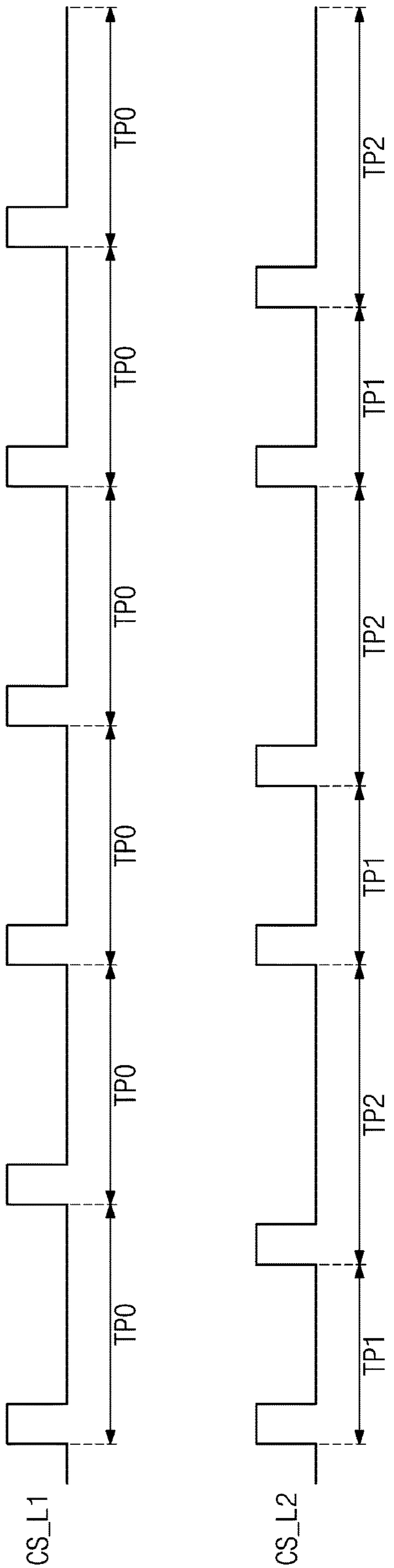
FIG. 6 is a waveform diagram illustrating a first latch control signal and a second latch control signal shown in FIG. 5.
Figure 7:
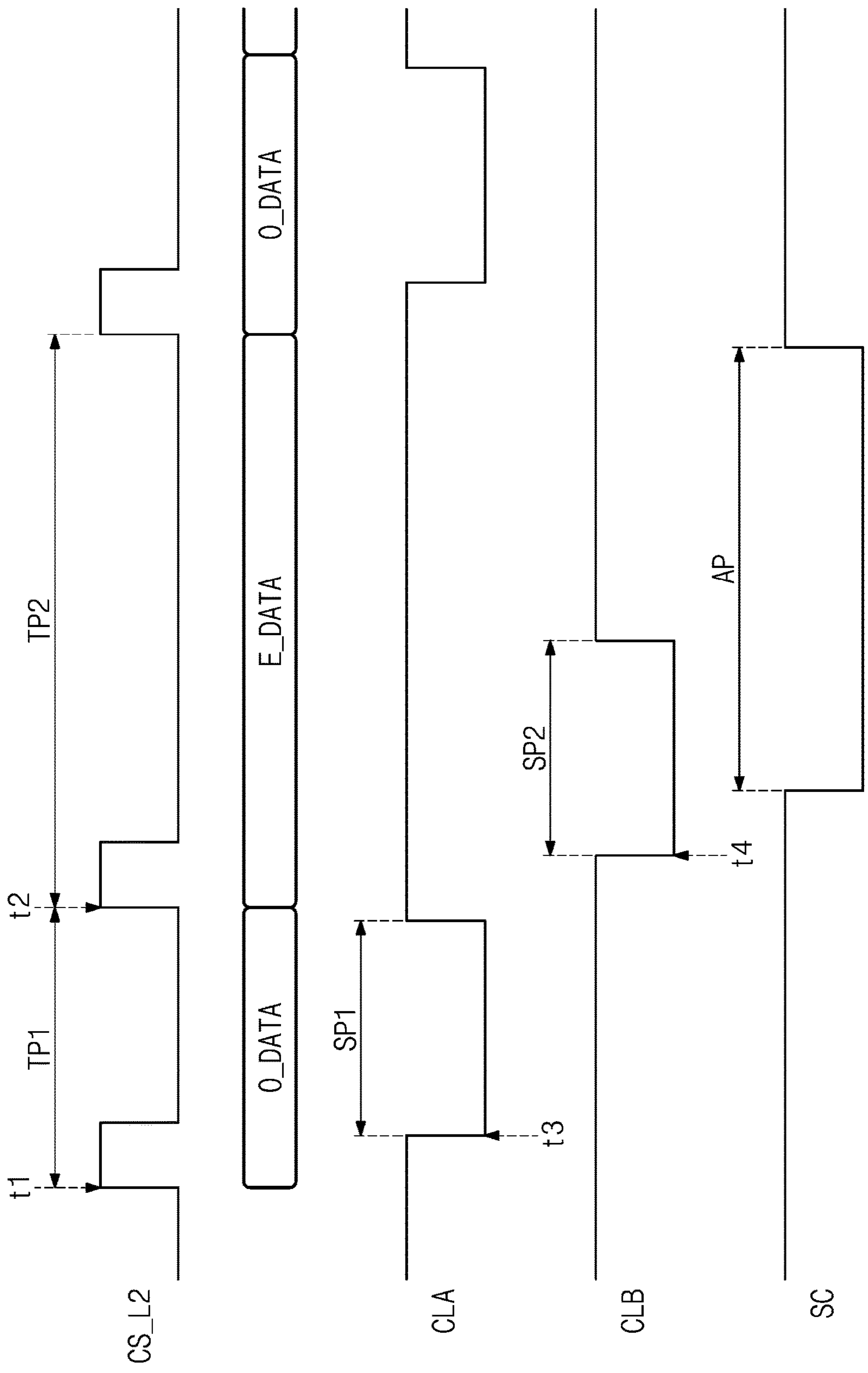
FIG. 7 is a waveform diagram illustrating first and second selection signals, a second latch control signal, and a scan signal according to an embodiment of the present disclosure.

FIG. 5 is a block diagram of a source driving circuit according to an embodiment of the present disclosure. FIG. 6 is a waveform diagram illustrating a first latch control signal and a second latch control signal shown in FIG. 5. FIG. 7 is a waveform diagram illustrating first and second selection signals, a second latch control signal, and a scan signal according to an embodiment of the present disclosure.

Referring to FIG. 5, the source driving circuit 200 may include a shift register 210, a first latch 221, a second latch 222, a third latch 223, a digital-to-analog converter 230, and an output buffer 240.

The shift register 210 may start an operation in response to a horizontal start signal STH and sequentially output a data clock signal CLK. The horizontal start signal STH may be a signal included in the source control signal DCS (see FIG. 3) provided from the driving controller 100 (see FIG. 3).

The data clock signal CLK output from the shift register 210 may be provided to the first latch 221. The first latch 221 may receive the image data DATA from the driving controller 100 and sequentially store the image data in response to the data clock signal CLK. "k" pieces of image data corresponding to the "k" channels CH1 to CHk of the source driving circuit 200 may be stored in the first latch 221. Hereinafter, for convenience of description, "k" pieces of image data may be referred to as line image data.

The first latch 221 may output line image data in parallel and provide the line image data to the second latch 222. That is, the first latch 221 may receive image data in serial form, but output the image data in parallel form. Here, receiving in serial form may mean sequentially receiving a plurality of pieces of image data corresponding to a plurality of pixels one by one, and outputting in parallel form may mean simultaneously outputting a plurality of pieces of image data corresponding to a plurality of pixels.

The second latch 222 may receive line image data from the first latch 221 and output the line image data in response to a first latch control signal CS_L1. The first latch control signal CS_L1 may be a signal included in the source control signal DCS (see FIG. 3) provided from the driving controller 100 (see FIG. 3). The first latch control signal CS_L1 may include a reference output interval TP0 (see FIG. 3) with a preset reference period. As shown in FIG. 6, in an embodiment, the reference period of the first latch control signal CS_L1 is not variable and may be constant.

The third latch 223 may receive line image data from the second latch 222 and output the line image data in response to a second latch control signal CS_L2. The second latch control signal CS_L2 may be a signal included in the source control signal DCS (see FIG. 3) provided from the driving controller 100 (see FIG. 3). As shown in FIG. 6, in an embodiment, the period of the second latch control signal CS_L2 is not constant and may be variable. In an embodiment of the present disclosure, the second latch control signal CS_L2 may include a first output interval TP1 and a second output interval TP2. The period of the first output interval TP1 may be different from the period of the second output interval TP2. For example, the period of the first output interval TP1 may be less than the reference period of the reference output interval TP0, and the period of the second output interval TP2 may be greater than the reference period of the reference output interval TP0. Although the period of the reference output interval TP0 of the first latch control signal CS_L1 is constantly fixed, when the third latch 223 is added to the source driving circuit 200, the periods of the first and second output intervals TP1 and TP2 of the second latch control signal CS_L2 may be freely adjusted. For example, it is possible to increase the width of an active interval AP of a scan signal SC by ensuring that the period of the second output interval TP2 overlapping the active interval AP of the scan signal SC is greater than the period of the first output interval TP1.

The digital-to-analog converter 230 may receive the line image data from the third latch 223. The line image data may have a digital form, and the digital-to-analog converter 230 may convert the line image data into data signals in analog form. The digital-to-analog converter 230 may receive gamma reference voltages VGM and convert line image data into data signals based on the gamma reference voltages VGM.

Data signals generated from the digital-to-analog converter 230 may be provided to the output buffer 240. The output buffer 240 may output the data signals through the channels CH1 to CHk (see FIG. 4) in response to an output enable signal OE. The output enable signal OE may be a signal included in the source control signal DCS (see FIG. 3) provided from the driving controller 100 (see FIG. 3).

Referring to FIGS. 5 to 7, the second latch control signal CS_L2 may include the first output interval TP1 and the second output interval TP2. A start time t1 of the first output interval TP1 may precede a start time t3 of the first selection interval SP1, and a start time t2 of the second output interval TP2 may precede a start time t4 of the second selection interval SP2. The start time t2 of the second output interval TP2 may follow the end time of the first selection interval SP1. Accordingly, in an embodiment, the second output interval TP2 does not overlap the first selection interval SP1.

The third latch 223 may output first data signal group O_DATA during the first output interval TP1 and output second data signal group E_DATA during the second output interval TP2. The first data signal group O_DATA may be applied to the first data line group through the first switching circuit 251 activated during the first selection interval SP1, and the second data signal group E_DATA may be applied to the second data line group through the second switching circuit 253 activated during the second selection interval SP2.

The duration of the first selection interval SP1 may be identical to the duration of the second selection interval SP2. In an embodiment, the first and second selection intervals SP1 and SP2 do not overlap each other.

Scan signals SC may be applied to each of the plurality of scan lines (e.g., the driving scan lines SCL1 to SCLn) shown in FIG. 3. In an embodiment, the active interval AP of each of the scan signals SC may overlap the second selection interval SP2 and does not overlap the first selection interval SP1. In an embodiment of the present disclosure, the active interval AP of each of the scan signals SC may be a low level interval, and the inactive interval may be a high level interval. However, the present disclosure is not limited thereto. For example, when the active interval AP of each of the scan signals SC is a high level interval, the inactive interval may be a low level interval.

In an embodiment of the present disclosure, the period of the second output interval TP2 may be greater than the period of the first output interval TP1. As described above, when the third latch 223 is added to the source driving circuit 200, it is possible to increase the width of the active interval AP of the scan signal SC by securing the period of the second output interval TP2 to be greater than the period of the first output interval TP1. As a result, even when a selective driving method of selectively driving the data lines DL1 to DLm is adopted, the active interval AP of the scan signal SC may be sufficiently secured, which may solve image quality problems caused by insufficient data charging time of each pixel PX.

Figure 8:
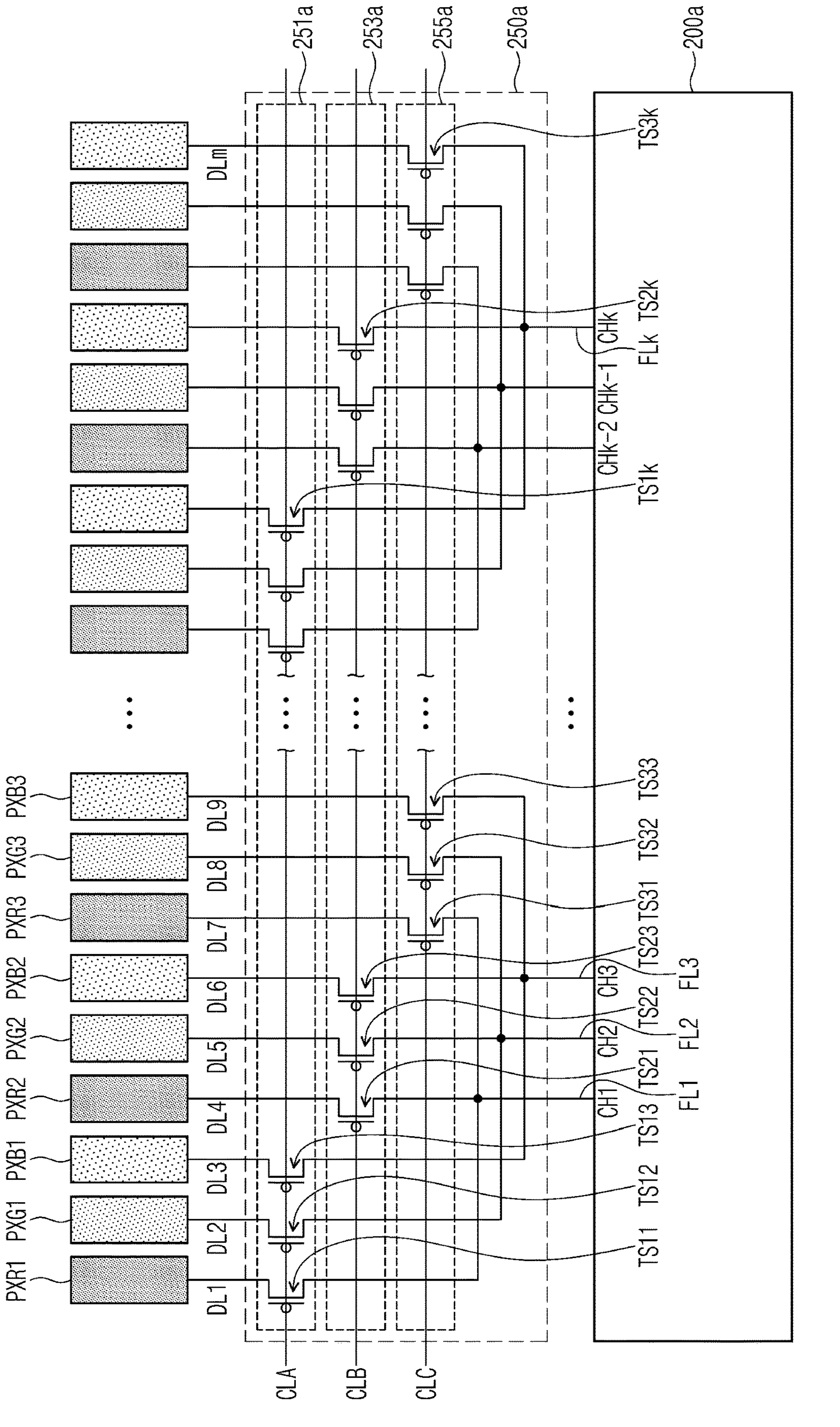
FIG. 8 is a block diagram showing a connection relationship between a source driving circuit and a selection circuit according to an embodiment of the present disclosure.
Figure 9:
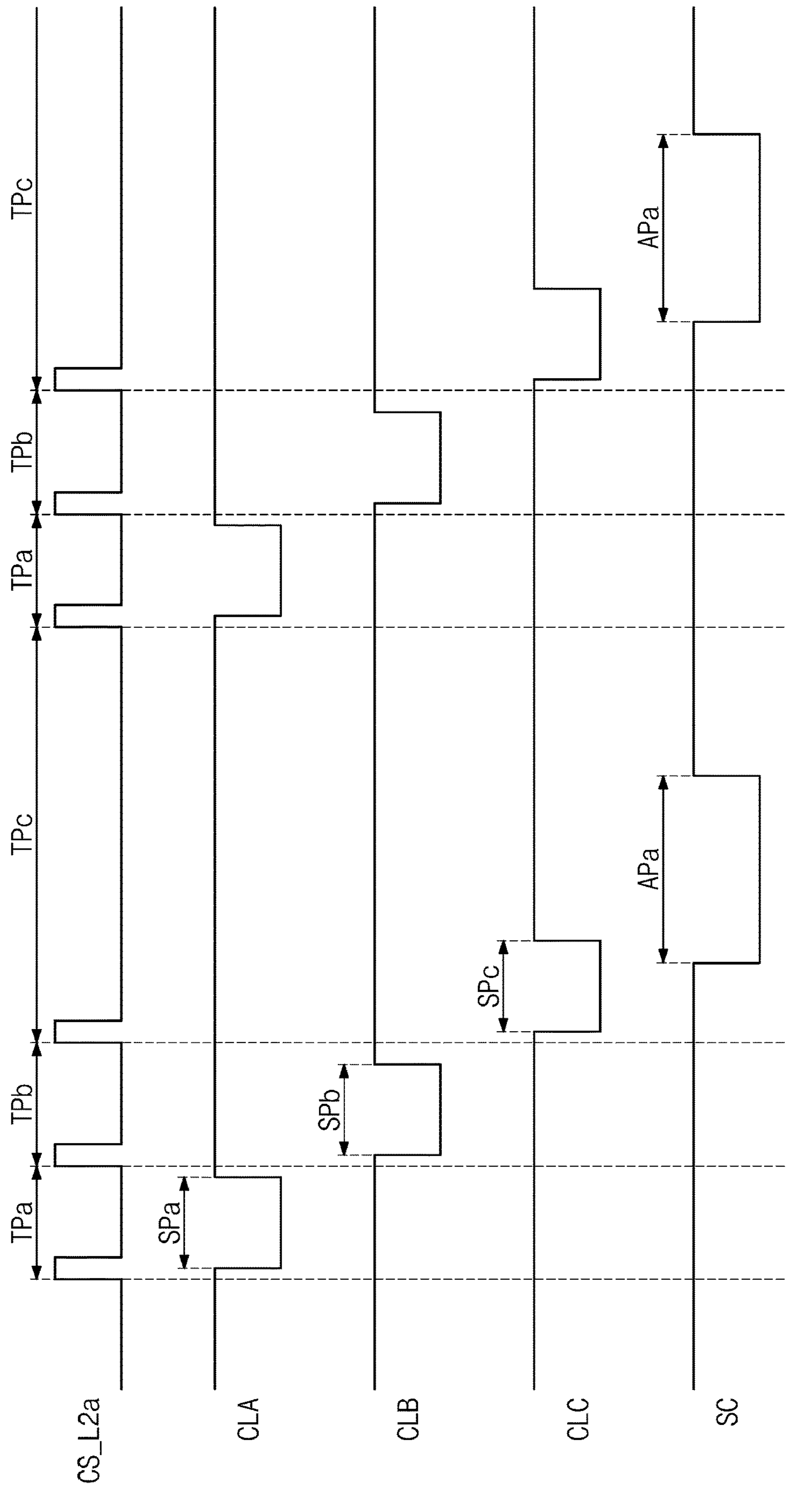
FIG. 9 is a waveform diagram illustrating first and second selection signals, a second latch control signal, and a scan signal according to an embodiment of the present disclosure.

FIG. 8 is a block diagram showing a connection relationship between a source driving circuit and a selection circuit according to an embodiment of the present disclosure. FIG. 9 is a waveform diagram illustrating first and second selection signals, a second latch control signal, and a scan signal according to an embodiment of the present disclosure. The same reference numerals are given to the same components as those shown in FIGS. 4 and 7 among the components shown in FIGS. 8 and 9, and thus, for convenience of explanation, a detailed description thereof will be omitted to avoid redundancy.

Referring to FIGS. 8 and 9, a source driving circuit 200*a* may be connected to a selection circuit 250*a* through the fanout lines FL1 to FLk. The source driving circuit 200*a* may include a plurality of channels CH1, CH2, CH3 to CHk−2, CHk−1, and CHk respectively connected to the fanout lines FL1 to FLk. The fanout lines FL1 to FLk may be selectively connected to relevant data lines among the data lines DL1 to DLm through the selection circuit 250*a*. In an embodiment of the present disclosure, the number (k) of fanout lines FL1 to FLk may be ⅓ of the number (m) of data lines.

The selection circuit 250*a* may include a plurality of switching circuits. In an embodiment of the present disclosure, the selection circuit 250*a* may include a first switching circuit 251*a*, a second switching circuit 253*a*, and a third switching circuit 255*a*. The first to third switching circuits 251*a*, 253*a*, and 255*a* may be activated in an alternate manner. An interval which the first switching circuit 251*a* is activated is referred to as a first selection interval SPa, an interval in which the second switching circuit 253*a* is activated is referred to as a second selection interval SPb, and an interval in which the third switching circuit 255*a* is activated is referred to as a third selection interval SPc. The first switching circuit 251*a* may be activated during the first selection interval SPa to electrically connect the fanout lines FL1 to FLk to some of the data lines DL1 to DLm (e.g., the first data line group). The second switching circuit 253*a* may be activated during the second selection interval SPb to electrically connect the fanout lines FL1 to FLk to some of the data lines DL1 to DLm (e.g., the second data line group). The third switching circuit 255*a* may be activated during the third selection interval SPc to electrically connect the fanout lines FL1 to FLk to some of the data lines DL1 to DLm (e.g., the third data line group).

The first switching circuit 251*a* may include a plurality of first switching transistors TS11 to TS1*k*, the second switching circuit 253*a* may include a plurality of second switching transistors TS21 to TS2*k*, and the third switching circuit 255*a* may include a plurality of third switching transistors TS31 to TS3*k*. The plurality of first switching transistors TS11 to TS1*k* may be connected between the first data line group and the fanout lines FL1 to FLk, and the plurality of second switching transistors TS21 to TS2*k* may be connected between the second data line group and the fanout lines FL1 to FLk. The plurality of third switching transistors TS31 to TS3*k* may be connected between the third data line group and the fanout lines FL1 to FLk.

Among the plurality of first switching transistors TS11 to TS1*k*, the (1-1)-th switching transistor TS11 may include an input electrode connected to the first fanout line FL1 of the fanout lines FL1 to FLk, an output electrode connected to the first data line DL1 of the data lines DL1 to DLm, and a control electrode that receives a first selection signal CLA. Among the plurality of first switching transistors TS11 to TS1*k*, the (1-2)-th switching transistor TS12 may include an input electrode connected to the second fanout line FL2 of the fanout lines FL1 to FLk, an output electrode connected to the second data line DL2 of the data lines DL1 to D1*m*, and a control electrode that receives the first selection signal CLA. Among the plurality of first switching transistors TS11 to TS1*k*, the (1-3)-th switching transistor TS13 may include an input electrode connected to the third fanout line FL3 of the fanout lines FL1 to FLk, an output electrode connected to the third data line DL3 of the data lines DL1 to D1*m*, and a control electrode that receives the first selection signal CLA.

Among the plurality of second switching transistors TS21 to TS2*k*, the (2-1)-th switching transistor TS21 may include an input electrode connected to the first fanout line FL1 of the fanout lines FL1 to FLk, an output electrode connected to the fourth data line DL4 of the data lines DL1 to DLm, and a control electrode that receives a second selection signal CLB. Among the plurality of second switching transistors TS21 to TS2*k*, the (2-2)-th switching transistor TS22 may include an input electrode connected to the second fanout line FL2 of the fanout lines FL1 to FLk, an output electrode connected to the fifth data line DL5 of the data lines DL1 to D1*m*, and a control electrode that receives the second selection signal CLB. Among the plurality of second switching transistors TS21 to TS2*k*, the (2-3)-th switching transistor TS23 may include an input electrode connected to the third fanout line FL3 of the fanout lines FL1 to FLk, an output electrode connected to the sixth data line DL6 of the data lines DL1 to DLm, and a control electrode that receives the second selection signal CLB.

Among the plurality of third switching transistors TS31 to TS3*k*, a (3-1)-th switching transistor TS31 may include an input electrode connected to the first fanout line FL1 of the fanout lines FL1 to FLk, an output electrode connected to the seventh data line DL7 of the data lines DL1 to DLm, and a control electrode that receives a third selection signal CLC. Among the plurality of third switching transistors TS31 to TS3*k*, a (3-2)-th switching transistor TS32 may include an input electrode connected to the second fanout line FL2 of the fanout lines FL1 to FLk, an output electrode connected to the eighth data line DL8 of the data lines DL1 to D1*m*, and a control electrode that receives the third selection signal CLC. Among the plurality of third switching transistors TS31 to TS3*k*, a (3-3)-th switching transistor TS33 may include an input electrode connected to the third fanout line FL3 of the fanout lines FL1 to FLk, an output electrode connected to the ninth data line DL9 of the data lines DL1 to D1*m*, and a control electrode that receives the third selection signal CLC.

When the first selection signal CLA is activated during the first selection interval SPa, the first switching transistors TS11 to TS1*k* may be turned on, and the data signals provided to the fanout lines FL1 to FLk may be applied to the first data line group through the first switching transistors TS11 to TS1*k*. When the second selection signal CLB is activated during the second selection interval SPb, the second switching transistors TS21 to TS2*k* may be turned on, and the data signals provided to the fanout lines FL1 to FLk may be applied to the second data line group through the second switching transistors TS21 to TS2k. When the third selection signal CLC is activated during the third selection interval SPc, the third switching transistors TS31 to TS3k may be turned on, and the data signals provided to the fanout lines FL1 to FLk may be applied to the third data line group through the third switching transistors TS31 to TS3k.

Referring to FIG. 9, in an embodiment, the cycle of a second latch control signal CS_L2a is not constant and may be variable. The second latch control signal CS_L2a may include a first output interval TPa, a second output interval TPb, and a third output interval TPc. The period of the first output interval TPa may be identical to the period of the second output interval TPb, and the period of the third output interval TPc may be different from the period of the first output interval TPa and the period of the second output interval TPb. The period of the third output interval TPc may be greater than the period of the first output interval TPa and the period of the second output interval TPb.

The start time of the first output interval TPa may precede the start time of the first selection interval SPa, and the start time of the second output interval TPb may precede the start time of the second selection interval SPb. The start time of the third output interval TPc may precede the start time of the third selection interval SPc. The second output interval TPb may follow the end time of the first selection interval SPa, and the third output interval TPc may follow the end time of the second selection interval SPb. Accordingly, in an embodiment, the second output interval TPb does not overlap the first selection interval SPa, and the third output interval TPc does not overlap the second selection interval SPb.

The first selection interval SPa may precede the second selection interval SPb, and the second selection interval SPb may precede the third selection interval SPc. The duration of the first selection interval SPa may be identical to the duration of the second selection interval SPb and the duration of the third selection interval SPc. In an embodiment, the first to third selection intervals SPa, SPb, and SPc do not overlap each other.

The first selection interval SPa of the first selection signal CLA may overlap the first output interval TPa of the second latch control signal CS_L2a, and the second selection interval SPb of the second selection signal CLB may overlap the second output interval TPb of the second latch control signal CS_L2a. The third selection interval SPc of the third selection signal CLC may overlap the third output interval TPc of the second latch control signal CS_L2a.

The third latch 223 (see FIG. 5) may output a first data signal group during the first output interval TPa, output a second data signal group during the second output interval TPb, and output a third data signal group during the third output interval TPc. The first data signal group may be applied to the first data line group through the first switching circuit 251a activated during the first selection interval SPa, and the second data signal group may be applied to the second data line group through the second switching circuit 253a activated during the second selection interval SPb. The third data signal group may be applied to the third data line group through the third switching circuit 255a activated during the third selection interval SPc.

The scan signals SC may be applied to each of the plurality of scan lines (e.g., driving scan lines SCL1 to SCLn) shown in FIG. 3. In an embodiment, an active interval APa of each of the scan signals SC may overlap the third selection interval SPc and does not overlap the first and second selection intervals SPa and SPb. In an embodiment of the present disclosure, the active interval APa of each of the scan signals SC may be a low level interval, and the inactive interval may be a high level interval.

As described above, although the number of channels CH1 to CHk and the number of fanout lines FL1 to FLk are reduced to ⅓ or ¼ of the number of data lines DL1 to DLm, when the third latch 223 is added to the source driving circuit 200, the period of the output interval (e.g., the third output interval TPc) that overlaps the active interval APa of the scan signal SC may be set larger than the period of the output interval (e.g., the first and second output intervals TPa and TPb) that do not overlap the active interval APa. Accordingly, the active interval AP of the scan signal SC may be sufficiently secured, which may solve image quality problems caused by insufficient data charging time of each pixel PX.

Figure 10:
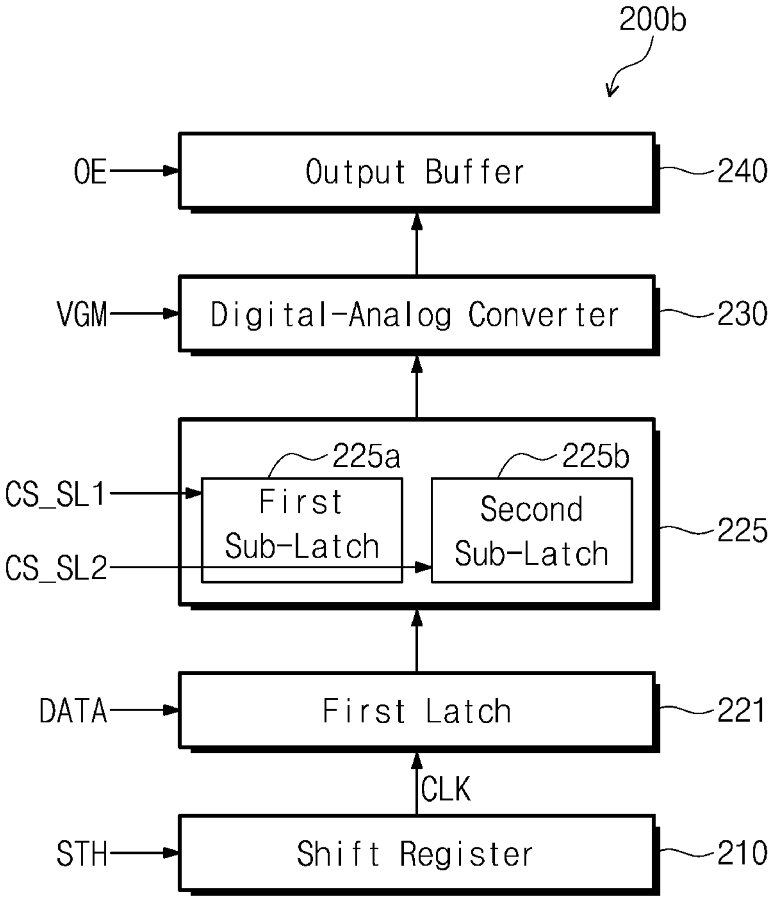
FIG. 10 is a block diagram of a source driving circuit according to an embodiment of the present disclosure.
Figure 11:
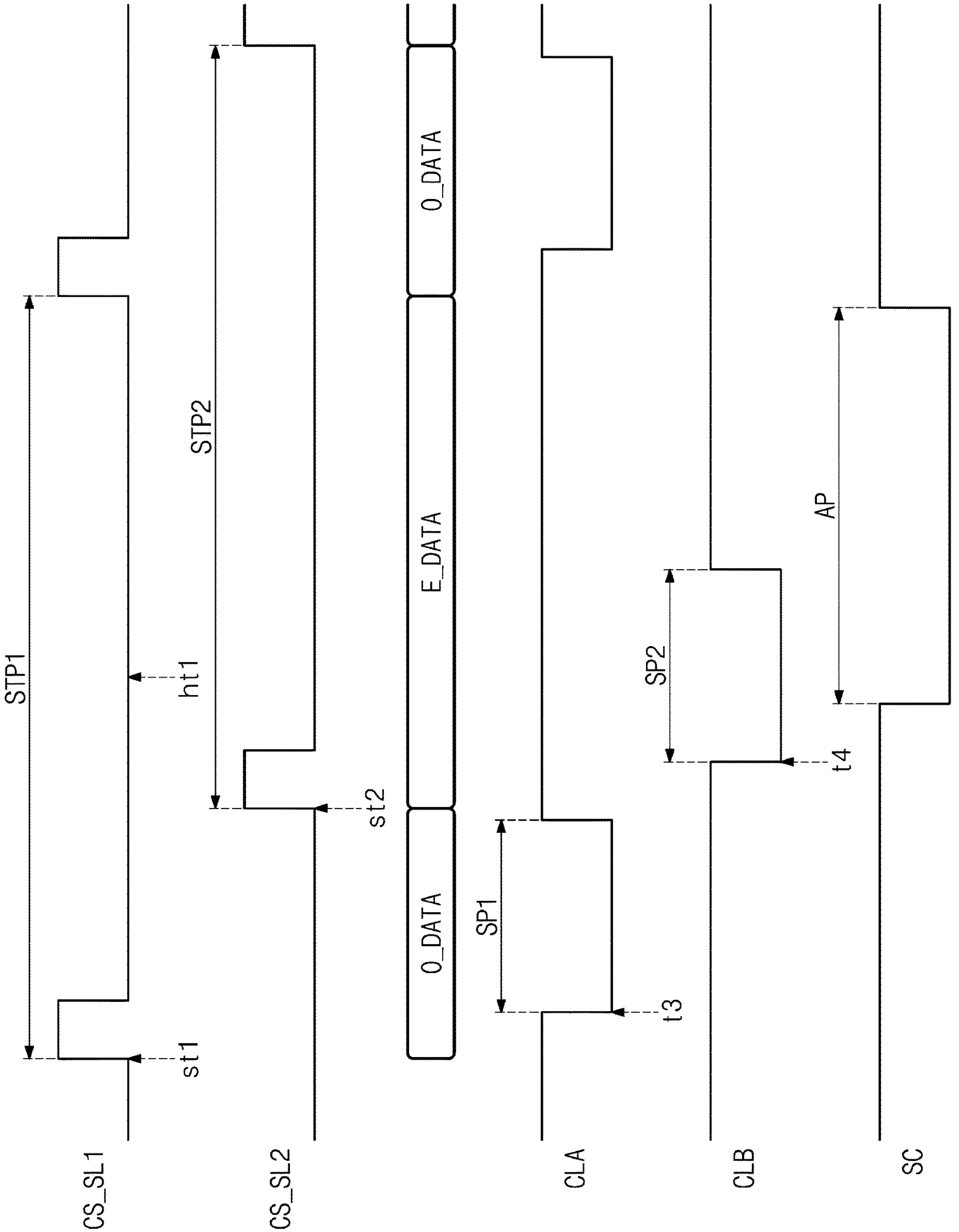
FIG. 11 is a waveform diagram illustrating first and second selection signals, first and second sub-latch control signals, and scan signals according to an embodiment of the present disclosure.

FIG. 10 is a block diagram of a data driver according to an embodiment of the present disclosure. FIG. 11 is a waveform diagram illustrating first and second selection signals, first and second sub-latch control signals, and scan signals according to an embodiment of the present disclosure. The same reference numerals are given to the same components as those shown in FIGS. 5 and 7 among the components shown in FIGS. 10 and 11, and thus, for convenience of explanation, a detailed description thereof will be omitted to avoid redundancy.

Referring to FIG. 10, the source driving circuit 200b may include the shift register 210, the first latch 221, a second latch 225, the digital-to-analog converter 230, and the output buffer 240.

The second latch 225 may include a first sub-latch 225a and a second sub-latch 225b. The second latch 225 may receive line image data from the first latch 221 and alternately store the line image data in the first and second sub-latches 225a and 225b. The second latch 225 may output first line image data of the first sub-latch 225a in response to a first sub-latch control signal CS_SL1, and output second line image data of the second sub-latch 225b in response to a second sub-latch control signal CS_SL2. The first and second sub-latch control signals CS_SL1 and CS_SL2 may be signals included in the source control signal DCS (see FIG. 3) provided from the driving controller 100 (see FIG. 3).

The first sub-latch control signal CS_SL1 may include a first sub-output interval STP1, and the second sub-latch control signal CS_SL2 may include a second sub-output interval STP2. The period of the first sub-output interval STP1 may be identical to the period of the second sub-output interval STP2. When the second latch 225 includes two or more sub-latches 225a and 225b, the start time of the sub-output interval may be set variably. In an embodiment of the present disclosure, the start time st1 of the first sub-output interval STP1 may precede the start time st2 of the second sub-output interval STP2. The start time st2 of the second sub-output interval STP2 may precede the ½ point ht1 of the first sub-output interval STP1.

A start time st1 of the first sub-output interval STP1 may precede a start time t3 of the first selection interval SP1, and a start time st2 of the second sub-output interval STP2 may precede a start point t4 of the second selection interval SP2. The start time st2 of the second sub-output interval STP2 may follow the end time of the first selection interval SP1. Accordingly, in an embodiment, the second sub-output interval STP2 does not overlap the first selection interval SP1. The start time t4 of the second selection interval SP2 may precede the ½ point ht1 of the first sub-output interval STP1.

The first sub-latch 225*a* may output the first data signal group O_DATA during the first sub-output interval STP1, and the second sub-latch 225*b* may output the second data signal group E_DATA during the second sub-output interval STP2. The first data signal group O_DATA may be applied to the first data line group through the first switching circuit 251 activated during the first selection interval SP1, and the second data signal group E_DATA may be applied to the second data line group through the second switching circuit 253 activated during the second selection interval SP2.

The duration of the first selection interval SP1 may be identical to the duration of the second selection interval SP2. In an embodiment, the first and second selection intervals SP1 and SP2 do not overlap each other.

The scan signals SC may be applied to each of the plurality of scan lines (e.g., driving scan lines SCL1 to SCLn) shown in FIG. 3. In an embodiment, the active interval AP of each of the scan signals SC may overlap the second selection interval SP2 and does not overlap the first selection interval SP1. In an embodiment of the present disclosure, the active interval AP of each of the scan signals SC may be a low level interval, and the inactive interval may be a high level interval. However, the present disclosure is not limited thereto. For example, when the active interval AP of each of the scan signals SC is a high level interval, the inactive interval may be a low level interval.

When the second latch 225 includes two or more sub-latches 225*a* and 225*b*, the start time of the second sub-output interval STP2 associated with the active interval AP of each scan signal SC may be sufficiently advanced. Therefore, even when a selective driving method of selectively driving the data lines DL1 to DLm is adopted, the active interval AP of the scan signal SC may be sufficiently secured, which may solve image quality problems caused by insufficient data charging time of each pixel PX.

According to embodiments of the present disclosure, when a third latch is added to a source driving circuit, it is possible to increase the width of the active interval of a scan signal by securing the period of a second output interval to be greater than the period of a first output interval. As a result, even when a selective driving method of selectively driving the data lines is adopted, the active interval of the scan signal may be sufficiently secured, which may solve image quality problems caused by insufficient data charging time of each pixel.

While the present disclosure has been described with reference to embodiments thereof, it will be apparent to those of ordinary skill in the art that various changes in form and detail may be made therein without departing from the spirit and scope of the present disclosure as defined by the following claims.

What is claimed is:

1. A display device, comprising:

a display panel including a plurality of pixels and a plurality of data lines connected to the plurality of pixels;

a source driving circuit configured to output a data signal to the plurality of data lines; and a selection circuit disposed between the plurality of data lines and the source driving circuit, and configured to selectively connect the source driving circuit to some of the plurality of data lines, wherein the source driving circuit includes:

a first latch configured to generate line image data by sequentially storing image data in response to a data clock signal;

a second latch configured to receive the line image data from the first latch and output the line image data in response to a first latch control signal; and a third latch configured to receive the line image data from the second latch and output the line image data in response to a second latch control signal, wherein a period of the first latch control signal is constant, and a period of the second latch control signal is variable, wherein the second latch control signal is different from the first latch control signal and is controlled independently from the first latch control signal, and the third latch is controlled by the second latch control signal, which is different from and controlled independently from the first latch control signal.

2. The display device of claim 1, wherein the selection circuit includes:

a first switching circuit configured to be activated during a first selection interval; and a second switching circuit configured to be activated during a second selection interval, wherein the second latch control signal includes:

a first output interval starting before a start time of the first selection interval, and a second output interval starting before a start time of the second selection interval, wherein a period of the first output interval is different from a period of the second output interval.

3. The display device of claim 2, wherein the first selection interval precedes the second selection interval, wherein the period of the second output interval is greater than the period of the first output interval.

4. The display device of claim 3, wherein the display panel further includes:

a plurality of scan lines connected to the plurality of pixels, wherein an active interval of each of the plurality of scan lines overlaps the second selection interval.

5. The display device of claim 2, wherein a duration of the first selection interval is substantially identical to a duration of the second selection interval.

6. The display device of claim 2, wherein the plurality of data lines includes:

a first data line group connected to the source driving circuit through the first switching circuit during the first selection interval; and a second data line group connected to the source driving circuit through the second switching circuit during the second selection interval.

7. The display device of claim 1, wherein the selection circuit includes:

a first switching circuit activated during a first selection interval;

a second switching circuit activated during a second selection interval; and a third switching circuit activated during a third selection interval, wherein the second latch control signal includes a first output interval starting before a start time of the first selection interval, a second output interval starting before a start time of the second selection interval, and a third output interval starting before a start time of the third selection interval, wherein periods of the first and second output intervals are different from a period of the third output interval.

8. The display device of claim 7, wherein the first selection interval precedes the second selection interval, and the second selection interval precedes the third selection interval, and wherein the period of the third output interval is greater than the periods of the first and second output intervals.

9. The display device of claim 8, wherein the display panel further includes:

a plurality of scan lines connected to the plurality of pixels, wherein an active interval of each of the plurality of scan lines overlaps the third output interval.

10. The display device of claim 7, wherein durations of the first to third selection intervals are substantially identical to each other.

11. The display device of claim 7, wherein the plurality of data lines includes:

a first data line group connected to a data driver through the first switching circuit during the first selection interval;

a second data line group connected to the data driver through the second switching circuit during the second selection interval; and a third data line group connected to the data driver through the third switching circuit during the third selection interval.

12. The display device of claim 1, wherein the source driving circuit further includes:

a shift register configured to generate the data clock signal;

a digital-to-analog converter configured to receive the line image data from the third latch and convert the line image data into the data signal; and an output buffer configured to output the data signal in response to an output enable signal.

13. The display device of claim 1, further comprising:

a driving controller configured to provide the image data, the data clock signal, and the first and second latch control signals to the source driving circuit.

14. An electronic device, comprising:

a display panel including a plurality of pixels and a plurality of data lines connected to the plurality of pixels;

a source driving circuit configured to output a data signal; and a selection circuit disposed between the plurality of data lines and the source driving circuit, and configured to selectively connect the source driving circuit to some of the plurality of data lines;

a driving controller providing image data, a data clock signal, and first and second sub-latch control signals to the source driving circuit; and a main controller providing an input image signal to the driving controller, wherein the source driving circuit includes:

a first latch configured to generate line image data by sequentially storing the image data in response to the data clock signal; and a second latch including a first sub-latch and a second sub-latch, and configured to alternately store the line image data received from the first latch in the first and second sub-latches, output first line image data of the first sub-latch in response to a first sub-latch control signal, and output second line image data of the second sub-latch in response to a second sub-latch control signal, wherein a start time of a second sub-output interval of the second sub-latch control signal precedes a ½ point of a first sub-output interval of the first sub-latch control signal.

15. The electronic device of claim 14, wherein a period of the first sub-latch control signal is substantially identical to a period of the second sub-latch control signal.

16. The electronic device of claim 14, wherein the selection circuit includes:

a first switching circuit activated during a first selection interval; and a second switching circuit activated during a second selection interval, wherein a start time of the first sub-output interval precedes a start time of the first selection interval, and wherein the start time of the second sub-output interval precedes a start time of the second selection interval.

17. The electronic device of claim 16, wherein a duration of the first selection interval is substantially identical to a duration of the second selection interval, and the first selection interval precedes the second selection interval, wherein the start time of the second selection interval precedes the ½ point of the first sub-output interval.

18. The electronic device of claim 17, wherein the display panel further includes:

a plurality of scan lines connected to the plurality of pixels, wherein an active interval of each of the plurality of scan lines overlaps the second selection interval.

19. The electronic device of claim 16, wherein the plurality of data lines includes:

a first data line group connected to a data driver through the first switching circuit during the first selection interval; and a second data line group connected to the data driver through the second switching circuit during the second selection interval.

20. The electronic device of claim 14, wherein the source driving circuit further includes:

a shift register configured to generate the data clock signal;

a digital-to-analog converter configured to receive the first or second line image data from the second latch and convert the first or second line image data into the data signal; and an output buffer configured to output the data signal in response to an output enable signal.

* * * * *